UNITED STATES PATENT OFFICE.

JOHN PEART, OF CORNING, NEW YORK, ASSIGNOR OF ONE-HALF HIS RIGHT TO ADAM PEART, OF SAME PLACE.

IMPROVEMENT IN LIQUID PAINTS.

Specification forming part of Letters Patent No. 171,845, dated January 4, 1876; application filed October 27, 1875.

*To all whom it may concern:*

Be it known that I, JOHN PEART, of Corning, in the county of Steuben and State of New York, have invented a certain new and useful Liquid Paint for outside work, of which the following is a full, clear, and exact description:

My invention relates to processes for producing liquid paints, which are sold in cans ready for use without further admixture; and my improvement over the ordinary process is more easily understood from the description which follows, and is specified in the claim.

The paint which forms the subject-matter of this patent is especially adapted for use upon outer walls or for outside work; and to make one gallon of such paint I take four pounds zinc oxide, ground in linseed-oil; four pounds lead carbonate, also ground in linseed-oil; one-half gallon boiled linseed-oil; four ounces gutta-percha dissolved in twelve ounces of hot turpentine; three ounces bees-wax dissolved in twelve ounces of hot linseed-oil; one ounce pearlash dissolved in one pint of warm water. The bees-wax must be poured into the mixture while warm.

When all the above ingredients are compounded in the proportions stated, a most excellent paint for outside work is produced, which has advantages over all other paints. This paint does not become chalky nor rub off. The colors remain bright for a long time.

In my process I use an excess of pearlash to compensate for the small amount of alkali in the white lead and zinc of commerce, which is insufficient to produce the desired effect. The white lead of commerce (lead carbonate) is too soft, and when used alone renders the paint chalky, and the zinc (zinc oxide) when used alone (as components of paint) renders it hard and brittle, and very liable to peel, blister, and become crisp, but when combined a tougher and more elastic mass is produced, and paint so made is not liable to the defects which are induced by either when used singly.

The essential qualities of gutta-percha and of bees-wax are well known, and I am aware that both are commonly used, and when combined with the other ingredients they add greatly to the brilliancy, elasticity, and durability of the paint.

Paint mixed by my process is not affected by expansion or contraction from heat or cold, and is not liable to peel. It has the superlative advantage of covering more surface than other paints with which I am acquainted, one gallon of my paint covering, on an average, about thirty-five square yards of surface. It sets quickly, and a rain-fall upon a newly-painted house will not spot the work. Colors are easily produced by those skilled in the art.

In this patent I claim—

A liquid paint for outside work, composed of zinc oxide, lead carbonate, linseed-oil, gutta-percha, bees-wax, turpentine, and pearlash and water, substantially as described.

In testimony that I claim the foregoing I have affixed my signature in the presence of two witnesses.

JOHN PEART.

Witnesses:
F. SCOTT DE WOLFE,
O. P. ROBINSON.